No. 698,312. Patented Apr. 22, 1902.
J. P. NEELEY.
ADJUSTABLE FIRE BOX FOR STOVES.
(Application filed Feb. 5, 1900.)
(No Model.) 4 Sheets—Sheet 1.
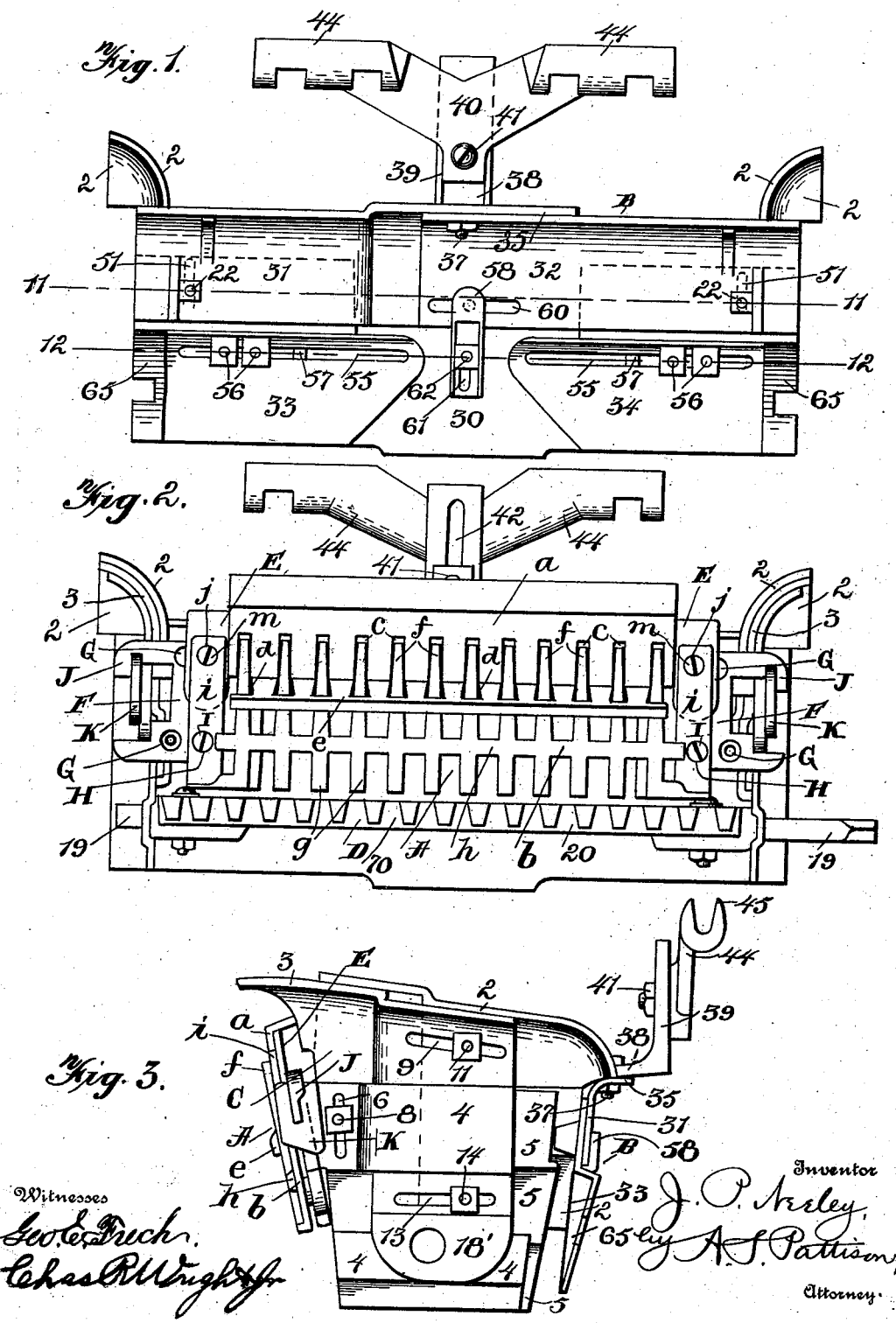
Witnesses
Geo. E. Buch.
Chas. R. Wright Jr.
Inventor
J. P. Neeley,
by A. S. Pattison,
Attorney.

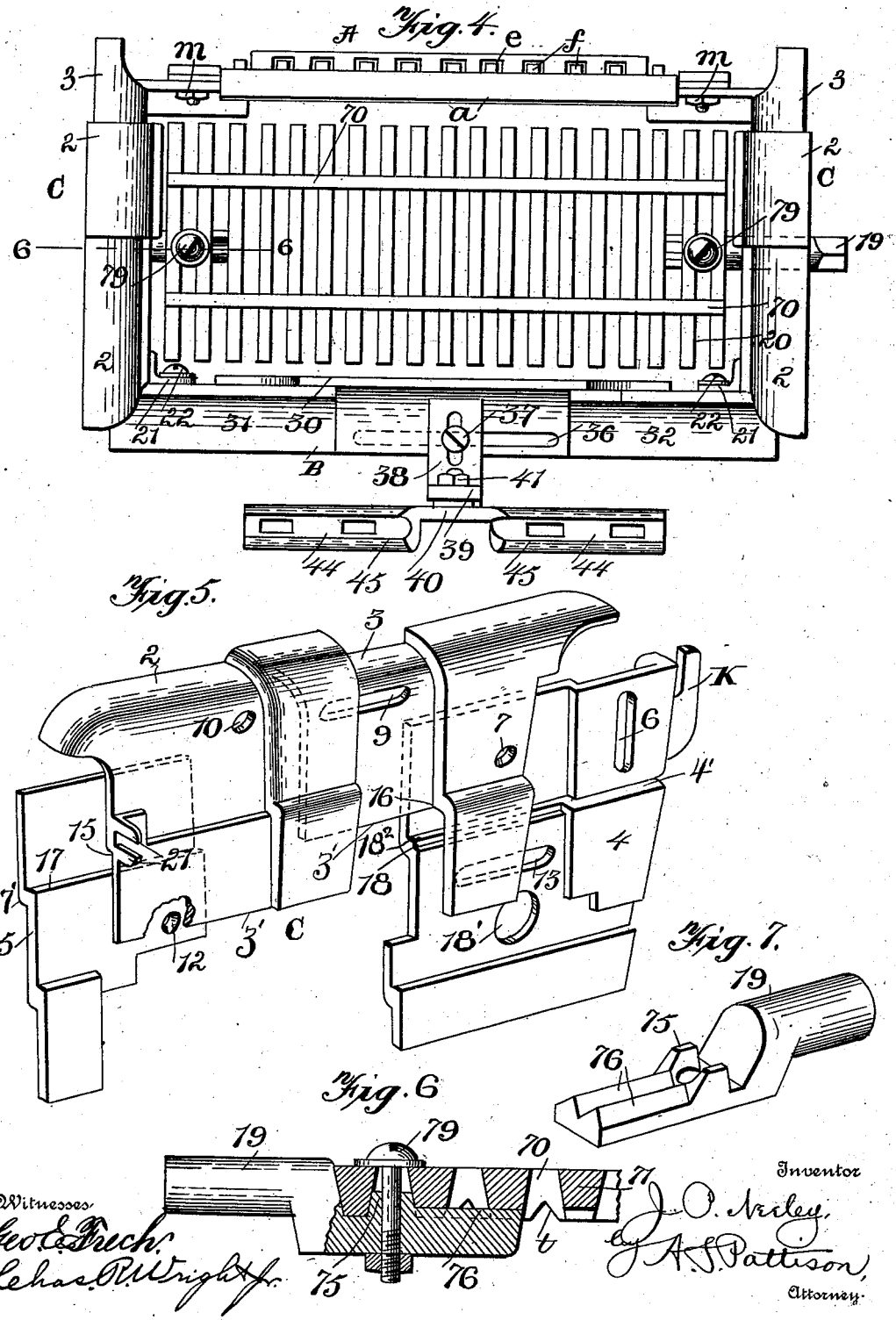

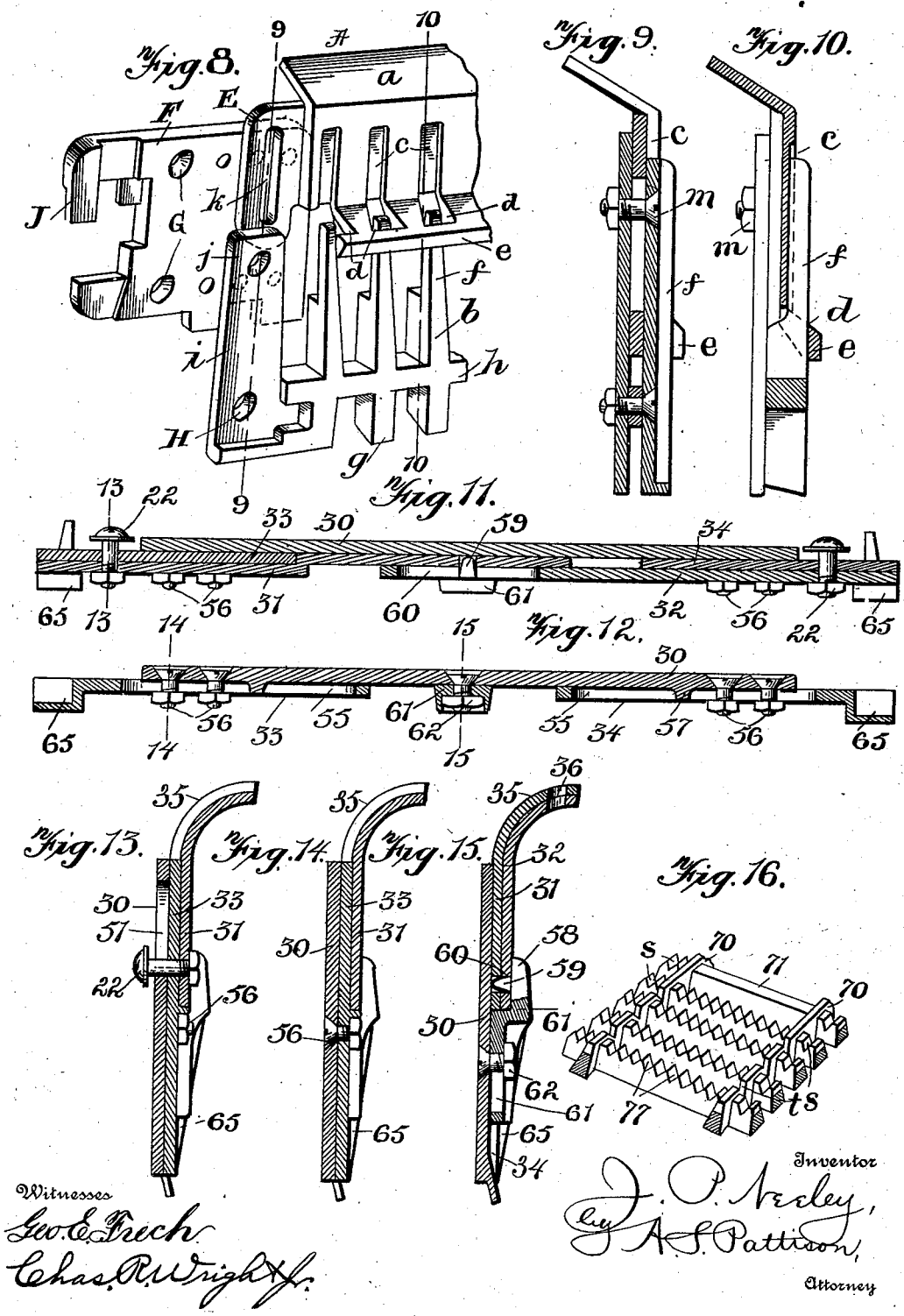

No. 698,312. Patented Apr. 22, 1902.
J. P. NEELEY.
ADJUSTABLE FIRE BOX FOR STOVES.
(Application filed Feb. 5, 1900.)
(No Model.) 4 Sheets—Sheet 4.

Witnesses
Geo. E. Frech.
Aly Scott

Inventor
J. P. Neeley,
by A. S. Pattison
his Attorney

THE NORRIS PETERS CO., PHOTO-LITHO., WASHINGTON, D. C.

UNITED STATES PATENT OFFICE.

JOSEPH P. NEELEY, OF CENTRALIA, WASHINGTON.

ADJUSTABLE FIRE-BOX FOR STOVES.

SPECIFICATION forming part of Letters Patent No. 698,312, dated April 22, 1902.

Application filed February 5, 1900. Serial No. 4,020. (No model.)

*To all whom it may concern:*

Be it known that I, JOSEPH P. NEELEY, a citizen of the United States, residing at Centralia, in the county of Lewis and State of Washington, have invented new and useful Improvements in Adjustable Fire-Boxes for Stoves, of which the following is a specification.

My invention relates to improvements in adjustable fire-boxes for stoves, all of which will be fully described hereinafter and particularly referred to in the claims.

Figure 17:
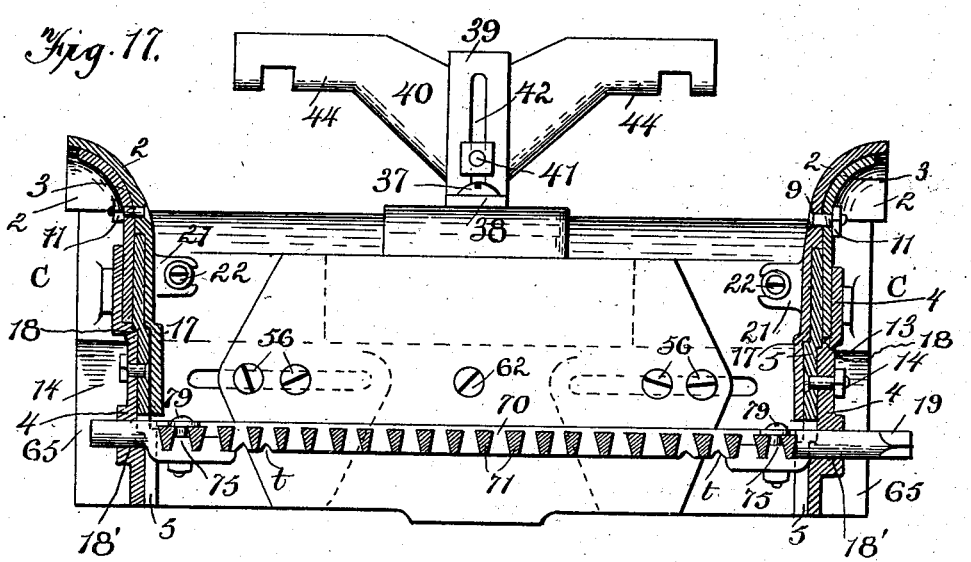
Figure 18:
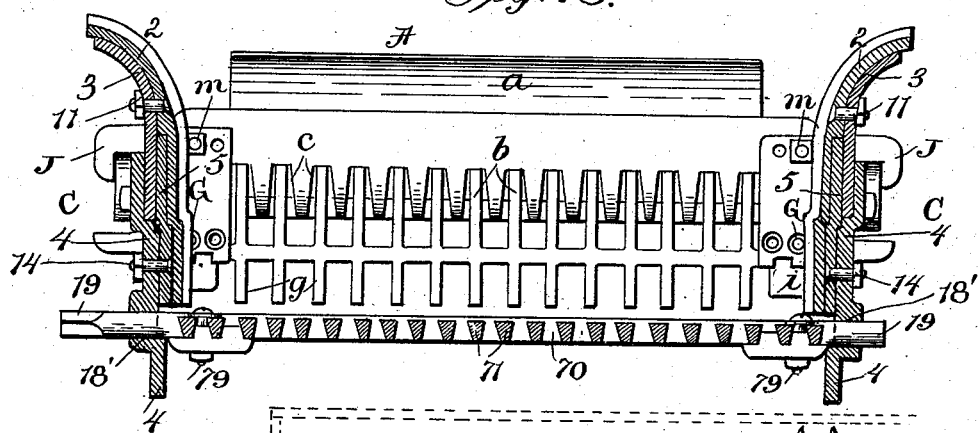
Figure 79:
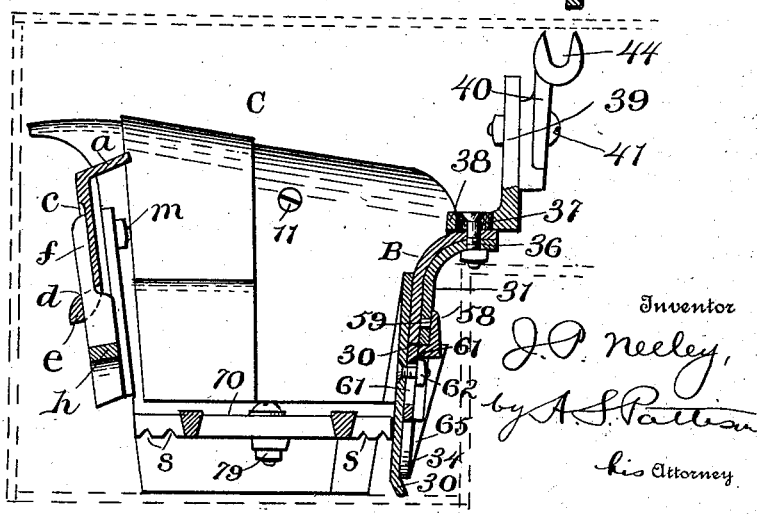

In the accompanying drawings, Figure 1 is a rear elevation of an adjustable fire-box embodying my invention. Fig. 2 is a front elevation of the same. Fig. 3 is an end elevation. Fig. 4 is a top plan view. Fig. 5 is a perspective view of one of the ends of the fire-box, the several parts composing the ends being shown in separated positions. Fig. 6 is a sectional view on the line 6 6 of Fig. 4. Fig. 7 is a detached perspective view of one of the detachable grate-journals. Fig. 8 is a perspective view of one end of the adjustable front of the fire-box, the parts being shown separated to disclose more clearly their specific construction. Fig. 9 is a sectional view on the dotted line 9 9 of Fig. 8. Fig. 10 is a sectional view on the line 10 10 of Fig. 8. Fig. 11 is a horizontal sectional view of the fireback of the box, taken on the line 11 11 of Fig. 1. Fig. 12 is a similar view taken on line 12 12 of Fig. 1. Fig. 13 is a vertical sectional view on the line 13 13 of Fig. 11. Fig. 14 is a sectional view on the line 14 14 of Fig. 12. Fig. 15 is a similar view on line 15 15 of Fig. 12. Fig. 16 is an inverted detached perspective view of one end of the grate. Fig. 17 is a longitudinal sectional view looking toward the rear. Fig. 18 is a longitudinal sectional view looking toward the front. Fig. 19 is a transverse sectional view.

Referring now to the drawings, A is an adjustable front, B the adjustable back, C the adjustable ends, and D the adjustable grate, the said members serving to constitute the entire fire-box. Each of these members consists of a number of parts, and I will now explain them separately and in detail.

The adjustable front consists, essentially, of an upper horizontal portion $a$ and a lower horizontal portion $b$. The upper portion $a$ is practically a solid piece and is provided with a plurality of vertical grooves $c$, which extend to the lower edge thereof and register with laterally-extending openings $d$, the said openings $d$ being formed in an outwardly-projecting flange $e$ at the lower end of the top horizontal portion $a$. The lower part $b$ constitutes the grate of the front of the box and has the upwardly-projecting teeth $f$, which project up through the openings $d$ and engage the vertical recesses $c$, and projecting downward are the teeth $g$, the teeth $f$ and $g$ being connected by a horizontal web $h$. Each end of the lower part $b$ of the front is provided with an upwardly-projecting ear $i$, having at its upper end a bolt-opening $j$, and each end of the upper part $a$ of this box is provided with laterally-projecting ears E, which are provided with vertical slots $k$, registering with the openings $j$ and through which the clamping-bolts $m$ pass. From this construction it will be seen that the front part or grate of the fire-box is vertically adjustable—that is, the lower part $b$ is adjustable upon the upper part $a$ for the purpose of regulating the depth of the front of the box, according to the stove to which it is attached. In order to provide for the longitudinal adjustment of this front, I provide each end thereof with the separate plates F, and these plates F are provided with an upper and a lower horizontal series of openings G, the upper series of openings adapted to register with the slot $k$ in the ears E of the upper part $a$ and the bolt-opening $j$ in the ears $i$ of the lower part $b$ and through which the bolt $m$ passes. The lower series of these openings G is adapted to register with the lower openings H, formed in the lower ends of the ears $i$ and through which clamping-bolts I pass. By means of this construction it will be seen that the front A of the fire-box is both vertically and transversely and also longitudinally adjustable. The ends of the plates F are provided with the hooks J, which are adapted to catch over the upturned hooks K, which project from the ends C of the fire-box.

I will now explain the construction of the ends of my fire-box. These ends consist of the four separate and adjustable parts 2, 3, 4, and 5. The front piece 4 is provided at its upper front corner with a vertical slot 6, which registers with a bolt-opening 7 in the intermediate piece 3, and through which slot and bolt-opening a clamping-bolt 8 passes and serves to unite the parts or pieces 3 and 4. The upper rear portion of the intermediate part 3 is provided with a horizontal slot 9, adapted to register with a bolt-opening 10, through which a clamping-bolt 11 passes, the said clamping-bolt uniting the parts 2 and 3 and permitting a horizontal adjustment thereof. The end piece 5 is provided with a bolt-opening 12 at its inner lower corner which registers with a horizontal slot 13, formed in the rear end piece 4, and passing through this opening and slot is a clamping-bolt 14, which serves to unite the rear and the front end pieces. It will also be noticed that the rear and the front end pieces 4 and 5 in addition to forming the front and rear ends of the end pieces also constitute the lower portion of the end pieces, while the intermediate pieces 2 and 3 constitute the upper portion of the end pieces. The plate 4 is provided with a shoulder 18², which is adapted to receive the lower end 3' of the plate 3, and the shoulder 18 is adapted to receive the shoulder 17' of the plate 5, while the shoulder 16 is adapted to rest upon the shoulder 4' of the plate 4 and the shoulder 17 adapted to receive the shoulder 15 of the plate 2. By so arranging the shoulders it will be readily seen that the several parts are held in their proper relative positions. The front end and lower piece 4 has in its lower portion a transverse opening 18', which serves as a bearing for the end shaft 19 of the grate 20. The grate and the said shaft or journal will be more fully explained hereinafter. The rear end of the part 2 is provided with an inwardly-extending notch formed by two parallel arms 21, the said arms being situated about midway between the ends thereof and serves as means for uniting the back B with the end piece C through the medium of the bolt 22, which passes through an opening formed in the back and registering with the notch between the said arms. The back and this connection will be more particularly referred to hereinafter. I have described the construction of one of the end pieces, and the construction of the other end piece being the same a separate explanation thereof is unnecessary.

From the above description it will be seen that the two pieces 4 and 5 are connected together independent of the pieces 2 and 3 through the medium of the bolt 14, and that the parts 2 and 3 are connected together independent of the parts 4 and 5 by the bolt 11, and that the top piece 4 is connected with the part 3 through the medium of the bolt 8, and that the two parts 2 and 3 are horizontally adjustable upon each other, and that the parts 4 and 5 are also horizontally adjustable upon each other, and that the part 4, together with the part 5, carried thereby, is vertically adjustable upon the part 3, and consequently the several parts constituting the ends are both vertically and horizontally adjustable for the purpose of varying the width of the fire-box and also for the purpose of varying the depth thereof.

The back D of my fire-box consists of several members, and the construction of this part of the box I will now describe. It consists of the inner part 30, the two upper and outer parts 31 and 32, and the two outer and lower parts 33 and 34. The upper edges of the upper and outer parts 31 and 32 curve outward, as shown at 35, and are provided with registering vertical bolt-openings 36, through which a clamping-bolt 37 passes. This bolt 37 also passes through the horizontal base 38 of a vertical leg 39, to which a vertically-adjustable top support 40 is vertically adjustably connected through the medium of a bolt 41, which passes through a slot 42, formed in the vertical leg 39. This support 40 has the diverging arms 44, each of which is U-shaped in cross-section, and the upper edges of the wall of these U-shaped arms are made rounding or to a point, as shown at 45, which reduces the point of contact between the support and the top of the stove. The ends of these upper parts 31 and 32 are each provided with transverse bolt-openings through which clamping-bolts 22 pass, and the upper and outer corners of the end pieces 33 and 34 are each provided with vertically-arranged slots 51, (shown in dotted lines, Fig. 1,) through which the said clamping-bolts 22 also pass and which serve to unite the end pieces 33 and 34 and the top pieces 31 and 32 and permit them to have a relative vertical adjustment. These bolts 22 also pass between the horizontal arms 21 and serve to clamp the end pieces and the back together. The lower end pieces 33 and 34 and this back B overlap the inner main portion 30 and are provided at their upper edges with the horizontal slots 55, through which clamping-bolts 56 pass, the said clamping-bolts also passing through the main part 30, and preferably projecting outward from the main part 30 within the slots 55 are the lugs 57. The two upper parts 31 and 32 are supported at their center by means of a vertically-adjustable cleat 58, the upper end of said cleat having a projection 59, fitting in horizontal slots formed, respectively, in the inner lower ends of the parts 31 and 32. This vertically-adjustable cleat has its lower end provided with a vertical slot 61, through which a bolt 62 passes, said bolt also passing through the main part 30 and serving to adjustably connect the cleat 58 with the part 30 and to thereby permit a vertical adjustment of the inner ends of the parts 31 and 32 corresponding with the vertical adjustment of their outer ends.

Attention is directed to the ends of the adjustable parts 33 and 34, which have the inclined portions 65, constituting shoulders adapted to support the fire-box back out of contact with the oven of the stove and which is beneficial both to the oven and the fireback by constituting a corresponding air-space between the two.

From the above description it will be noted that I have provided a fire-box in which the back, front, and ends are vertically and longitudinally adjustable for the purpose of fitting the box to different-sized stoves.

The grate 20 consists of two longitudinal webs 70 and a plurality of transverse webs 71. The projecting ends of the transverse pieces are provided with notches s, whereby they can be broken off for the purpose of varying the width of the grate according to the adjustment of the parts, and the ends of the longitudinal webs 70 are provided with the notches t for the purpose of enabling the end or ends of the grate to be broken off for the purpose of varying the length thereof according to the adjustment of the fire-box. The notches s and t are preferably made in the upper side of the grate. The grate is provided with detachable shafts or bearings 19, which consist of essentially L-shaped pieces, as shown in Fig. 7, the outer ends being round to fit in the journals 18' of the end pieces, and their inner ends provided with the transverse projections 75, adapted to fit between the transverse webs, as shown in Fig. 6, and with the longitudinal projections or ridges 76, which fit in a transverse series of notches 77, formed in the transverse webs between the longitudinal webs, and the bearings are detachably connected with the ends of the grate through the medium of the clamping-bolts 79. By means of this construction the grate can be reduced either in width or length, and the bearings can be adjusted laterally upon the grate for the purpose of centering them thereon according to the width thereof, as will be readily understood when the width has been reduced by the breaking of the projecting end or ends of the transverse webs, as before explained.

Having thus described my invention, what I claim, and desire to secure by Letters Patent, is—

1. In a fire-pot, a back consisting of a main central portion, side portions horizontally adjustable thereon, and top portions having their outer ends vertically adjustable on the side plates and their inner ends vertically and horizontally adjustable on the main central portion, substantially as described.

2. In a fire-pot, a back consisting of a main central portion, side portions horizontally adjustable thereon, top portions having their outer ends vertically adjustable on the side plates and a vertically-adjustable clip on said main central portion and carrying a pin adapted to engage horizontal slots in the top portions, whereby the inner free ends of the top portions are vertically and horizontally adjustable on the central portion, substantially as described.

3. In a fire-pot, an end piece comprising a main lower section having a grate-journal, a secondary lower section horizontally adjustable on the main section, a top section between the two lower sections and vertically adjustably connected to the lower main section and a second top member horizontally adjustable on the first top member substantially as described.

4. In a fire-pot, an end piece comprising a main lower section having a grate-journal therein, a hook carried by said section adapted to receive the front of the pot, a secondary lower section horizontally adjustable on the main section, a top section between the two lower sections and vertically adjustably connected to the lower main section, a second top member horizontally adjustable on the first section, and a pronged lug carried thereby adapted to receive a member carried by the back, substantially as described.

5. In a fire-box, a front comprising an upper and a lower part interlocking with each other, outwardly-extending ears carried by the ends of said upper section and having vertical slots therein, outwardly-extending ears carried by the lower section and overlapping the ears of the upper section and having a vertically-arranged row of openings, a securing-plate having a series of vertically-arranged openings, a hook carried by the outer end of said plate, and securing-bolts passing through the openings in the lower section, the slot in the upper section and through any of the desired openings in the securing-plate, substantially as described.

In testimony whereof I have hereunto set my hand in the presence of two subscribing witnesses.

JOSEPH P. NEELEY.

Witnesses:
GEO. E. RHODES,
H. H. HAMER.